M. W. FORBES.
COMBINED TRUCK AND JACK.
APPLICATION FILED FEB. 25, 1921.

1,391,773.

Patented Sept. 27, 1921.

INVENTOR,
Martin W. Forbes,
BY
Howard S. Smith,
His ATTORNEY

UNITED STATES PATENT OFFICE.

MARTIN W. FORBES, OF MIAMISBURG, OHIO.

COMBINED TRUCK AND JACK.

1,391,773.	Specification of Letters Patent.	Patented Sept. 27, 1921.

Application filed February 25, 1921. Serial No. 447,821.

*To all whom it may concern:*

Be it known that I, MARTIN W. FORBES, a citizen of the United States, residing in the city of Miamisburg, in the county of Montgomery and State of Ohio, have invented certain new and useful Improvements in Combined Trucks and Jacks, of which the following is a specification.

The principal object of my invention is to provide for a combined truck and jack of the type shown in my U. S. Patent No. 368,883, granted August 23rd, 1887, improved means for raising and lowering the carrying platform. These lifting means are simple in construction, efficient in operation, and are adapted to elevate with ease a platform upon which heavy articles or objects are placed.

Figure 1:
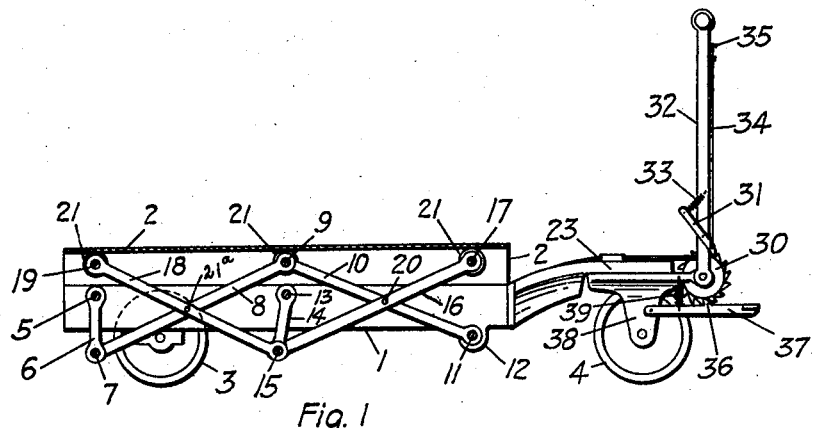
Figure 2:
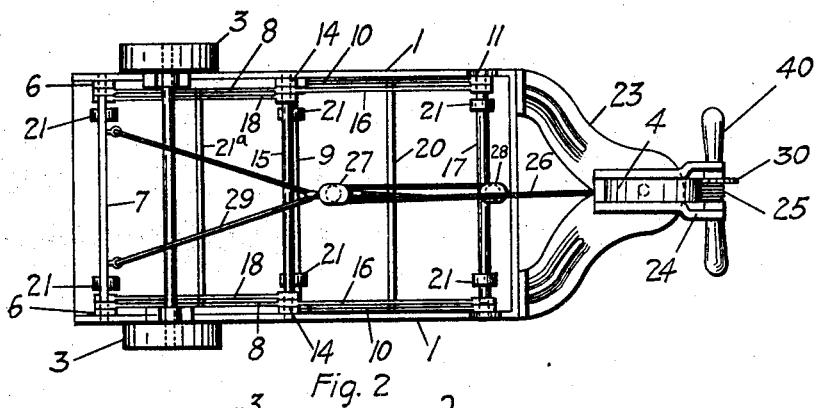
Figure 3:
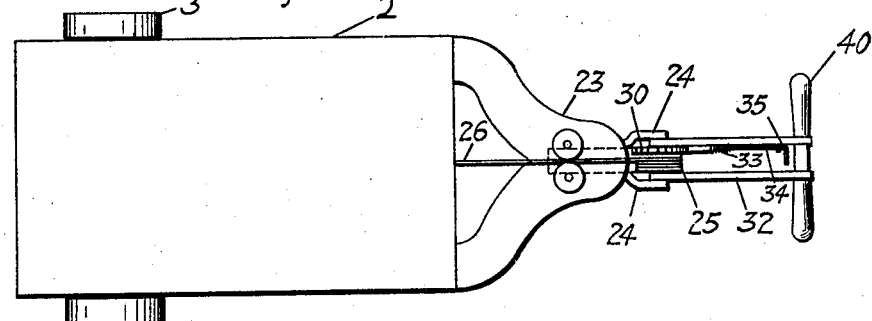

In the accompanying drawings, Figure 1 is a side elevational view of a truck equipped with my improved platform elevating means, with one side removed to show the elevating mechanism. Fig. 2 is a bottom plan view of the truck. And Fig. 3 is a top plan view thereof.

Throughout the specification and drawings, similar reference characters denote corresponding parts.

In a detailed description of the preferred form of embodiment of my invention, the numerals 1, 1 designate the side members of a frame, and 2 a lifting platform, constructed of any suitable material and in any desirable form. The frame is mounted on two rear wheels 3, 3 and a single swiveled front wheel 4.

Secured by a pin 5 to the rear inside portion of each side member 1, is the upper end of a link 6. Secured between the lower ends of the links 6, 6 is a transverse rod 7 which is connected by a pair of links 8, 8 to a middle transverse rod 9 above the frame 1. Also secured to the rod 9 are the upper ends of a pair of links 10, 10 whose lower ends are secured by pins 11 to bearing projections 12 on the bottom front portions of the side members 1, 1. (See Figs. 1 and 2.)

Secured by a pin 13 to the middle interior portion of each side member 1, is the upper end of a link 14. Secured between the lower ends of the links 14, 14 is a transverse rod 15 from which there project upwardly above the front portion of the frame, a pair of links 16, 16 whose upper ends are connected by a transverse rod 17. Also connected to the rod 15 are the lower ends of a pair of links 18, 18 whose upper ends are connected to a transverse rod 19. Each link 10 crosses, and is connected to, the middle portion of the link 16 on its respective side of the truck by a rod 20; while each link 8 crosses, and is connected to, the middle portion of the link 18 on its respective side of the truck by a rod 21$^a$. Preferably mounted on each of the transverse rods 9, 17 and 19 is a pair of rollers 21, 21 which engage the under surface of the platform 2 to elevate it when the toggle mechanism just described is operated by the following means.

Supported by the front wheel 4 is the converging front portion 23 of the frame, in the forks 24, 24 of which is journaled a drum or roller 25 on which is secured one end of a cable 26, the other end of which is passed around pulleys in blocks 27 and 28 for attachment to the block 27 to form a compound pulley. Secured to the rear end of the pulley block 27 is the middle portion of a cable 29 whose free ends are secured to the end portions of the transverse rod 7. (See Fig. 2.)

Secured to the drum 25 is a ratchet wheel 30. Adapted to engage the teeth of the ratchet wheel 30 is a dog 31 pivotally secured to a tongue 32 and held in engagement with said teeth by a spring 33. Secured to the dog 31 between its pivot and its point is an operating rod 34 which terminates at its upper end in a finger grip portion 35 by which the rod may be pulled to withdraw the dog from engagement with the teeth of the ratchet wheel 30. The numeral 36 designates a pawl projection on a foot lever 37 whose front end is pivotally secured to one of the bearings 38 for the front wheel 4. By a spring 39 the foot lever is drawn upwardly to hold the pawl 36 normally in engagement with the teeth on the ratchet wheel 30.

In operation, when a load is placed on the platform 2, it may be jacked up or elevated by employing the tongue 32 as a lever. When the tongue 32 is pulled down by a handle 40 thereon, it will drive the ratchet wheel 30 forward through the dog 31, to wind the cable 26 around the drum 25. By means of the compound pulley described, the cable 26 will exert a forward pull on the transverse rod 7 which, through the links 8, 8, will elevate the transverse rod 9. The latter will raise the links 10, 10 to elevate the upper ends of the links 16, 16 that are pivotally connected to the links 10, 10 by the rods 20. The links 18, 18 being pivotally connected by rods 21ª to the links 8, 8, will be elevated by the latter. It will thus be seen that when the transverse rod 7 is pulled forwardly by the cable 29, the transverse rods 9, 17 and 19 will be elevated in unison by the toggle mechanism to elevate the carrying platform 2, through the rollers 21 carried by said rods.

When the load has been elevated to a desired height, the pawl 36 that engages the teeth on the ratchet wheel 30 will hold the platform 2 in its raised position until the foot lever 37 is depressed to disengage said pawl from the ratchet teeth. The tongue 34 should then be permitted to return slowly to its vertical position, with the dog 31 in engagement with the ratchet teeth to prevent a sudden descent of the carrying platform 2.

While I have shown cable means for operating the toggle mechanism to raise the platform, any other means may be employed for this purpose without departing from the spirit of the invention. Furthermore, I do not wish to be limited to other details of construction and arrangement herein shown and described, and any changes or modifications may be made therein within the scope of the subjoined claims.

Having described my invention, I claim:

1. In a device of the type described, the combination with a truck frame, of links pivotally secured at their upper ends to the latter, upwardly inclined supporting members pivotally secured at their lower ends to the free ends of said links and to the middle portions of each other, a platform resting upon the free top portions of said supporting members, and means for actuating one or more of said links to thrust the supporting members upwardly to elevate the platform above the frame.

2. In a device of the type described, the combination with a truck frame, of a pair of links pivotally secured within said frame, a transverse rod connecting the free ends of said links, a pair of elevating members pivotally secured at their lower ends to said rod, a second pair of elevating members pivotally secured at their upper ends to the first elevating members and at their lower ends to the frame, a second pair of links pivotally secured to the middle portion of said frame, forwardly and rearwardly projecting elevating members pivotally secured at their lower ends to the second pair of links and at their middle portions to the first and second pairs of elevating members, a platform supported by the forwardly and rearwardly projecting elevating members and the first elevating members, a tongue on said truck, and pulling means connected between the transverse rod and said tongue to actuate the links to raise the platform when the tongue is lowered.

In testimony whereof I have hereunto set my hand this 24th day of February, 1921.

MARTIN W. FORBES.

Witness:
HOWARD S. SMITH.